Figure 1:
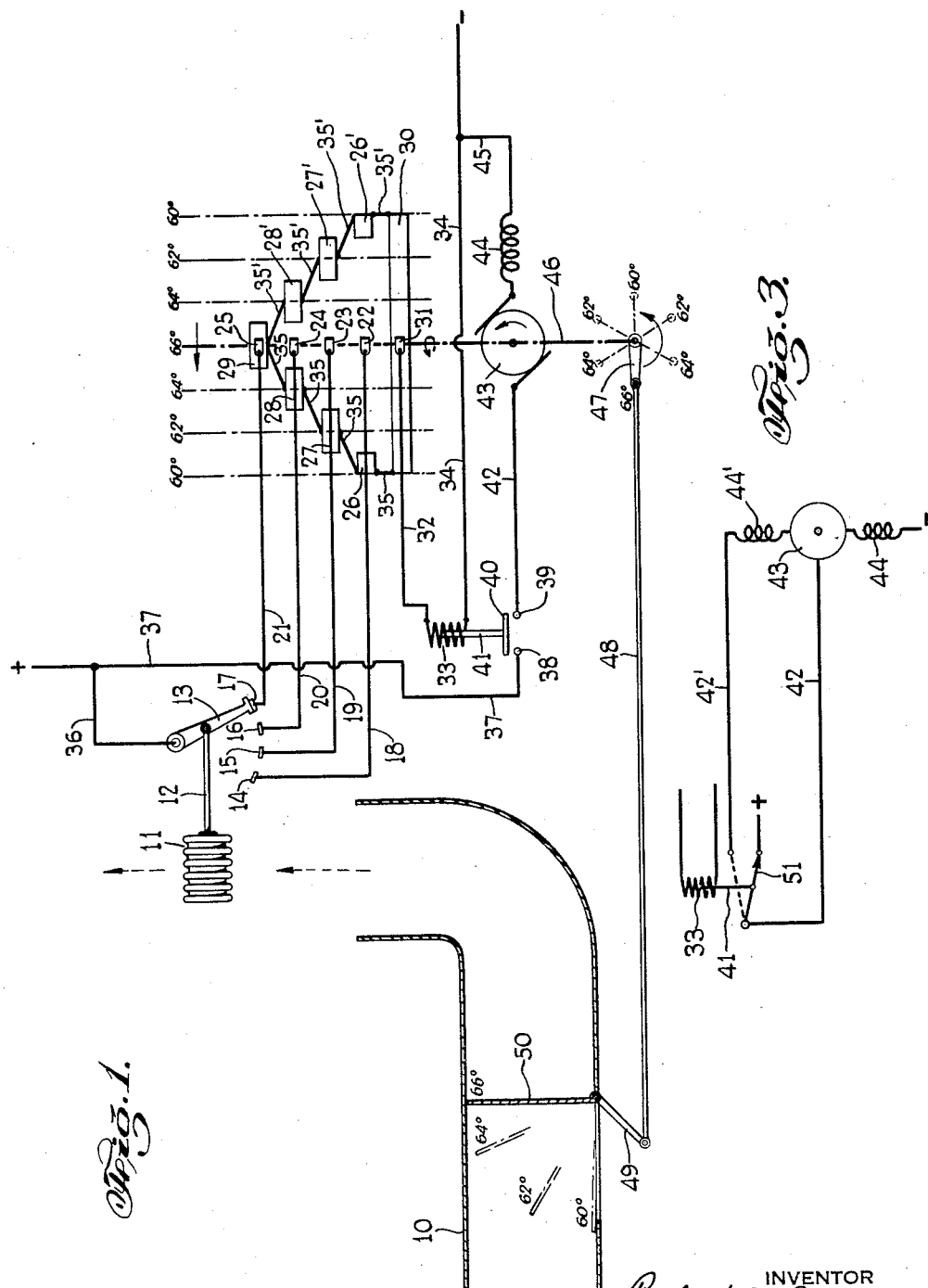

Patented June 15, 1943

2,322,054

UNITED STATES PATENT OFFICE 2,322,054

HEATING AND VENTILATING SYSTEM

Robert J. Parsons, Schenectady, N. Y., assignor to Consolidated Car Heating Company, Inc., Albany, N. Y., a corporation of New York Application August 13, 1940, Serial No. 352,353

1 Claim. (Cl. 236—76)

This invention relates to new and useful apparatus for heating and ventilating enclosures such as rooms, trolley cars, and the like, and has especial reference to improvements in means whereby the dampers controlling the admission and exhaust of the heating and ventilating fluid may be automatically and thermostatically controlled by the temperature within the enclosure being heated and/or ventilated.

A main object of the invention is to provide simple, efficient and compact means whereby a thermostat within the enclosure may, by its movement responsive to temperature, cause the selective actuation of a control device such as a motor to alter the position of one or more damper plates to selectively control the flow of ventilating or heating fluid throughout the system.

A further object of the invention is to provide a simple and efficient apparatus whereby the movement of the thermostat element throughout a series of regulated predetermined temperature steps will cooperate with a switch controller to determine the degree of movement of a motor connected to the dampers.

A further object is to provide a simple and efficient means to insure the quick stoppage of the motor when desired.

A further object is to provide a simple and efficient system whereby when relays are used, in one case the movement of the thermostat element effects the de-energization of a relay in the motor circuit and in another form effects the energization of a similar relay.

Further and more specific objects, features, and advantages will more clearly appear from a consideration of the specification hereinafter when taken in connection with the accompanying drawings which form part of the specification and which illustrate a present preferred form of the invention.

In a general contemplation of the invention in its broadest aspects, it should be noted that a thermostat is placed well within the enclosure to be heated and/or ventilated and that there is connected thereto a switch arm which, with the movement of the thermostat under the change of temperature, moves across a plurality of contacts connected by suitable wiring to a controller drum or device mounted on the shaft of a motor. The controller contacts are wired in circuit with a relay which in one form is always energized when the switch arm is on a contact and holds the motor circuit open, but closes the motor circuit when the arm moves off a contact. The motor then starts to rotate and continues until contacts of the controller are encountered which are in circuit with the thermostatic switch arm in its new position at which time the relay is energized and the motor circuit is opened and a brake or snubber is brought into action which stops the motor instantly. The motor is connected to suitable linkage which is connected to damper plates in the flues or pipes leading from the heating means to the interior of the enclosure to be heated so that the position of the damper plates is determined by the degree to which the motor is rotated and that is determined by the change in the position of the thermostatically operated element.

In another form of the invention the controller and the relay are somewhat changed so that the relay is normally deenergized and closes the motor circuit only when energized.

Figure 2:
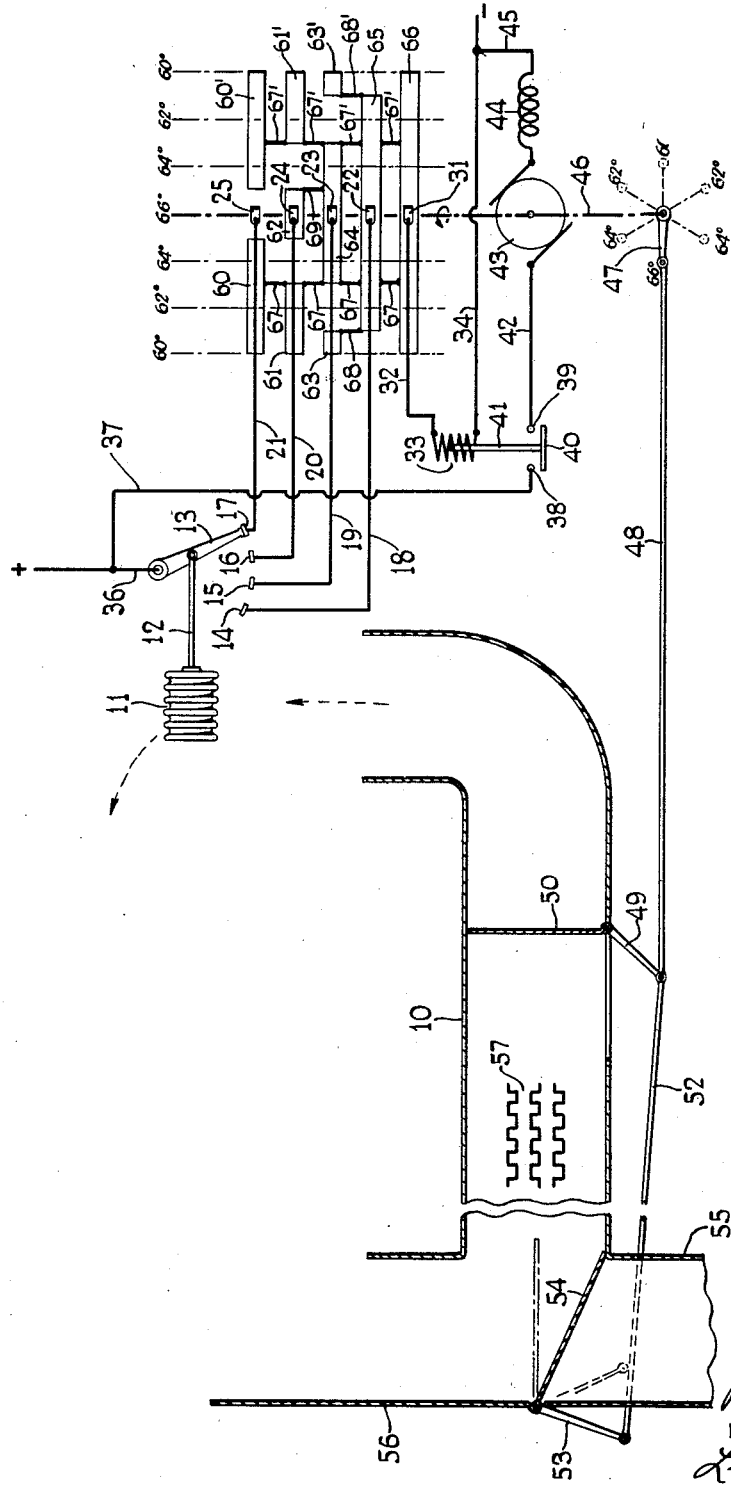

The present preferred forms of the invention are illustrated in the drawings of which:

Figure 1 is a diagrammatic representative form in which the motor relay is normally energized when the motor circuit is open; Fig. 2 is a similar view of the form in which the motor relay is normally deenergized when the motor circuit is open; and Fig. 3 is a schematic diagram of a device for snubbing or stopping the motor instantly when desired.

In the form of the invention shown in Fig. 1 there is shown a pipe or flue 10 along which passes heated air from suitable heating means, not shown. This heated air passes upward out of the end of the pipe 10 into an enclosure to be heated such as the interior of a trolley car. A thermostatic device 11 is disposed within the enclosure and preferably well away from the direct influence of the air coming out of the pipe 10. Connected to the thermostat 11 is a movable shaft 12 which moves as the temperature changes in the enclosure affects and moves the thermostatic element. The shaft is connected to a pivoted arm 13, the lower end of which is adapted to swing over and into contact with a series of contacts such as 14, 15, 16, and 17 which are connected by wires respectively 18, 19, 20, and 21 to a series of brushes 22, 23, 24, and 25 associated with a drum like controller which is shown in flat developed form and which carries a series of oppositely disposed contact plates such as 26, 26′, 27, 27′, 28, 28′. The drum also has an upper single ring plate 29 and a lower single ring plate 30. A brush 31 bears on the lower ring 30 and is connected by a wire 32 to a relay coil 33, the other side of which is connected by a wire 34 to the negative side of the power circuit. On one side of the controller drum the contact plates 29, 28, 27, 26, and 30 are connected respectively to each other by wires such as 35, and on the other side of the drum the contact plates 29, 28', 27', 26', and 30 are connected respectively to each other by similar wires 35'.

The fixed end of the switch arm 13 is connected by wire 36, to the positive side of the power line. The power line also extends wire 37 to a pair of spaced contacts 38 and 39 which are adapted to be bridged by a bridge plate 40 on the lower end of a stub shaft 41 actuated by the relay coil 33. A wire 42 connects contact 39 with one terminal of a motor 43 the other terminal of which is connected to a field coil 44 and a wire 45 to the negative side of the power line. The motor shaft 46 supports and moves not only the controller drum but also a lever 47 connected to a link 48 which in turn is connected to a short lever 49 connected to the end of a damper plate 50 disposed in the flue 10 between the heating elements and the interior of the enclosure to be heated.

In Fig. 3, the relay coil 33 actuates the stub shaft 41 which has also thereon a switch arm 51, which, when the relay is energized, is lifted to place in circuit a snubbing coil 44' through wire 42' to act as a brake on the motor which stops it instantly.

In the form of the invention shown in Fig. 2, the motor is operated upon energization of the relay coil 33. The parts in this form of the invention are largely the same as above described with respect to Fig. 1 except as follows:

The link 48 is extended as link 52 to lever 53 connected to the lower end of another damper plate 54 disposed in the flue 10 beyond the heating resistance which is shown as 57. An inlet from the outside air is shown as 55 and an inlet from the interior of the enclosure is shown as 56.

Also the controller contact plates are differently arranged to allow for the different relay action. In this form of the controller the contact plates are arranged generally oppositely as follows: plates 60 and 60' at the top; next plates 61 and 61' with an intermediate contact 62; then plates 63 and 63' with an intermediate plate 64; then plate 65; and beneath it a long plate 66. Wires 67 connect respectively plates 60, 61, 64, 65, and 66 and wires 67' respectively connect plates 60', 61', 64, 65 and 66. Wires 68 and 68' respectively connect plates 63—65 and 63'—65 and a wire 69 connects 62 with 64. The bridge piece 40 is now disposed below the contacts 38 and 39 and closes or bridges them only when the relay coil 33 is energized.

Taking up the discussion of the operation of the form of the invention shown in Fig. 1 it will be seen that the switch arm 13 is on the contact 17 which represents the highest temperature to which the enclosure is to be heated for instance 66 degrees. Having reached this position the circuit through the relay is from positive power line through arm 13, contact 17, wire 21, brush 25, contact plate 29, through wires 35 and contact plates 28, 27, and 26 to plate 30 to brush 31, wire 32 relay coil 33, wire 34 to negative side of the line. This will energize the relay and lift the bridge 41 so that the motor circuit is opened and so that, upon the lifting action, the snubber shown in Fig. 3 is effective to stop the motor instantly.

When the thermostat moves the arm 13 to contact 16 from contact 17 which corresponds to a drop from 66 to 64 degrees then the relay circuit just traced is broken and the bridge 40 drops closing the motor circuit through wire 37, contacts 38 and 39, wire 42 motor 43, field coil 44, wire 45 to the negative side of the line. The motor starts to move and thus moves the linkage connected to the damper plate 50 to move the plate from the position shown in Fig. 1 which is its fully closed position to one where it is partly open corresponding to the admission to the interior of the car of some of the heated air which has previously been passing downward out through the exhaust passage adjacent the damper plate 50. The switch arm 13 has moved to the contact 16 which is connected by wire 20 with brush 24 on the controller, and as the motor starts to move in a counterclockwise direction as shown by the arrows, the contact plate 28' is soon brought under the brush 24 which will then establish a circuit to the relay coil 33 which will then be energized to lift the bridge 40 and open the motor circuit and stop the motor in the manner above mentioned. If the thermostat for some reason should suddenly move all the way over to contact 14 representing a drop to 60 degrees, then the motor circuit is closed again through the deenergization of the relay coil 33 and is not closed again until it is reestablished through the contact 14, wire 18 brush 22 coming into contact with contact plate 26'. In this position of the parts the damper plate 50 has been moved over to the position where all the heated air is allowed to pass into the interior of the car and the exhaust passage is closed.

As the heat rises the thermostat will move the switch arm 13 to the right and the same action will be repeated with the motor rotating in the same direction only in this action the contact plates 26, 27, 28, and 29 will have been moved around to position to come respectively and selectively under the influence of the brushes 22, 23, 24, and 25 as the position of the thermostatic switch arm 13 may determine. Therefore it will be seen that as soon as the arm 13 moves from one contact to another the motor circuit is closed through the opening of the relay circuit and the motor motion continues until the relay circuit is again closed through whatever circuit has been established through the switch arm 13, the position of which is proportionate to the temperature change. Consequently, the position of the damper plate 50 is always calculated to either decrease or increase the heat supplied to the interior of the car dependent upon the position of the thermostatic switch arm 13.

In the form of the invention shown in Fig. 2, the switch arm 13 is shown at the 66 degree position on contact 17 but in that position the brush 25 is not in contact with any of the plates on the controller drum, and therefore the relay coil 33 is deenergized and the bridge 40 is down and the motor circuit is open and the motor is not moving. When the switch arm 13 moves say to contact 15 representing a drop to 62 degrees, a circuit is established as follows: from positive power line, wire 36, switch arm 13, contact 15, wire 19, brush 23, contact plate 64, wire 67, contact plate 65, wire 67, contact plate 66, brush 31, wire 32, coil 33, wire 34, to negative side of the power line, which energizes the relay coil and lifts the bridge 40 and closes the motor circuit which can be traced exactly as before. The motor starts to move and moves the controller drum and the damper plate 50 to the proper position corresponding to the position to supply sufficient heat to overcome this drop in temperature and at the same time will lift the damper plate 54 a predetermined amount to let in a fresh supply of air from the outside into the system. When the controller drum has been moved a sufficient distance the brush 23 runs off the contact plate 64 and the relay coil circuit is opened with the brush lying unconnected between the right end of plate 64 and the adjacent plate 63'. The operation and cooperation of the parts as the switch arm 13 moves to other positions can be readily traced from the description already given since in this form the relay is deenergized normally and is energized as soon as the arm 13 moves to a new position to then close the motor circuit which is then broken only when the motor has moved the controller a proper distance to effect the damper action as desired and through the controller then open the relay circuit.

It will thus be seen that the invention in either of its forms involves the provision of a thermostatic device, a damper system in flues supplying heated air to the enclosure, a motor operating a controller and the damper system together with a relay which is under the control of the thermostatic switch arm to be either energized or deenergized to close the motor circuit and achieve the desired movement of the parts whereupon the relay circuit is then either closed or opened to open the motor circuit and stop the movement.

While the invention has been described in detail and with respect to present preferred forms which the invention may assume it is not to be limited to such details and forms since many changes and modifications may be made in the invention without departing from the spirit and scope of the invention in its broadest aspects. Hence it is desired to cover any and all forms and modifications which the invention may assume which may come within the language or scope of the appended claim.

What I desire to claim as my invention and to secure by Letters Patent of the United States, is:

In combination, a damper adapted to control the flow of heat to an enclosure, a thermostat in said enclosure, a motor connected to and operating said damper, a switch arm operated by the thermostat and having positions depending upon the degree of heat in the enclosure, a controller, including an insulating drum provided on its periphery with current conducting strips; brushes, one positioned to bear on each strip; means connecting the motor and the controller drum whereby the rotation of the motor causes a rotation of the drum; a relay; a plurality of partial circuits between the switch arm and the controller and a single partial circuit between the controller and the relay, said relay being normally energized when the switch arm is in a closed position with respect to its connections to the controller, the motor circuit being closed when the relay is deenergized by the movement of the switch arm from one position to another, said relay being energized again when the motor has moved the controller a predetermined distance.

ROBERT J. PARSONS.